United States Patent [19]

Uemura et al.

[11] Patent Number: 4,758,961

[45] Date of Patent: Jul. 19, 1988

[54] TOOL MOVE CONTROL METHOD AND APPARATUS FOR PREVENTING TOOL INTERFERENCE WITH AN OBJECT.

[75] Inventors: Kazuki Uemura, Nagoya; Yukio Itatsu, Inuyama; Toshikazu Sakai, Minokamo, both of Japan

[73] Assignee: Yamazaki Machinery Works, Ltd., Niwa, Japan

[21] Appl. No.: 883,951

[22] Filed: Jul. 10, 1986

[51] Int. Cl.$^4$ .................. G06F 15/46; G05B 23/02
[52] U.S. Cl. .................. 364/474; 318/565; 364/184
[58] Field of Search ............... 364/474, 475, 167–171, 364/191–193, 184–187; 318/568, 632, 563, 565

[56] References Cited

U.S. PATENT DOCUMENTS

| | | | |
|---|---|---|---|
| 4,131,836 | 12/1978 | Noda | 364/474 X |
| 4,481,568 | 11/1984 | Inaba et al. | 364/474 X |
| 4,482,968 | 11/1984 | Inaba et al. | 364/474 X |
| 4,489,377 | 12/1984 | Mawyer et al. | 364/474 X |
| 4,513,366 | 4/1985 | Munekata et al. | 364/474 X |
| 4,651,601 | 3/1987 | Sasaki | 364/475 X |

Primary Examiner—Joseph Ruggiero
Attorney, Agent, or Firm—Cushman, Darby & Cushman

[57] ABSTRACT

A tool move control method is disclosed. It comprises the steps of setting an interference area for an object which should not be interfered with a tool when a tool rapid move is instructed by a start point and a terminal point for the tool movement, setting an entry prohibit quadrant for prohibiting the tool entry and two or more of quadrants for permitting a move of the tool in the interference area, and controlling a move mode of the tool according to quadrants belonging to the start point and the terminal point in such a manner as to avoid the entry prohibit quadrant. A tool move control apparatus is also disclosed.

11 Claims, 5 Drawing Sheets

(PRIOR ART)

| START POINT / TERMINAL POINT | QUADRANT A | B | C |
|---|---|---|---|
| A | SIMULTANEOUS TWO AXES | SIMULTANEOUS TWO AXES | SIMULTANEOUS TWO AXES |
| B | SIMULTANEOUS TWO AXES | SIMULTANEOUS TWO AXES | ONLY X AXIS UPTO $O_x$, THEREAFTER SIMULTANEOUS TWO AXES |
| C | SIMULTANEOUS TWO AXES | ONLY $\bar{Z}$ AXIS UPTO $O_{\bar{z}}$, THEREAFTER SIMULTANEOUS TWO AXES | SIMULTANEOUS TWO AXES |

FIG. 7

| START POINT / TERMINAL POINT | QUADRANT a | b | c |
|---|---|---|---|
| a | SIMULTANEOUS TWO AXES | SIMULTANEOUS TWO AXES | SIMULTANEOUS TWO AXES |
| b | SIMULTANEOUS TWO AXES | SIMULTANEOUS TWO AXES | UPTO $O_x$ --→TWO AXES |
| c | SIMULTANEOUS TWO AXES | UPTO $O_{\bar{z}}$ --→TWO AXES | SIMULTANEOUS TWO AXES |

4,758,961

TOOL MOVE CONTROL METHOD AND APPARATUS FOR PREVENTING TOOL INTERFERENCE WITH AN OBJECT.

BACKGROUND OF THE INVENTION

1. The Field of the Invention

This invention relates to a tool move control method and a tool move control apparatus wherein a tool can be smoothly moved without interfering with a workpiece and a tail stock in a numerically controlled lathe, when the tool is rapidly moved.

2. Description of the Prior Art

Figure 8:
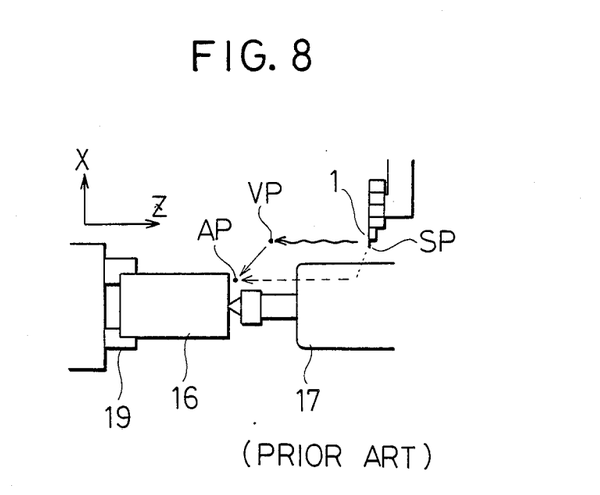
FIG. 8 is a plan view showing a conventional tool move method.

Heretofore, in order to move a tool without interfering with a workpiece and a tail stock when the tool is rapidly moved, such as when a machining on the tool is started, at machining operation, or when the machining is finished, as shown for example in FIG. 8, a relay point VP is set in a machining program between a start point SP and an approach point AP with respect to a workpiece 16. Tool 1 is controlled to move via the relay point VP.

There is known another method wherein a tool is automatically moved between the approach point AP and the relay point VP, while the tool is manually moved by an operator between the relay point VP and the start point SP.

However, in the case of the former, a programmer is required to instruct all travelling paths of the tool from the start point to the approach point in the machining program. Thus, preparation work of the machining program becomes complicated. In addition, there remains a risk of a programming error which requires a complete prior check. In the case of the latter, every time the tool is rapidly moved, the operator is required a manual operation. This results in a greater work load for the operator. In addition, manual operation is against modern trends which perform machining using automation.

Further, in recent years, various kinds of barrier functions and stroke limit functions have been employed and added to the conventional device in order to prevent a tool from entering into a certain area. However, such functions intend to merely prohibit the entry of a tool and stop the action of working at that time. They do not intend to move a tool in a manner which avoids an interfering subject.

SUMMARY OF THE INVENTION

It is therefore an object of the present invention to provide a highly reliable tool move control method and a tool move control apparatus, which eliminates the above-mentioned disadvantages. In the present invention, when a tool is rapidly moved, a programmer is not required to instruct a relay point in a machining program and is not required to manually move the tool every time thus possessing automation without stopping move action of the tool.

A method according to the present invention comprises the steps of determining an interference area for an object which a tool should not interfere with when a rapid tool move from a start point to a terminal point is wanted, setting an entry prohibit quadrant for prohibiting tool entry in the interference area, setting two or more of quadrants for permitting tool entry in these quadrants, and controlling a move mode of the tool according to quadrants belonging to the start point and the terminal point in such a manner as to avoid entering the prohibit quadrant.

Due to the afore-mentioned embodiment, the tool is caused to move in such a manner as to avoid the entry into the interference area. Accordingly, there occurs no interference between the tool and the object which should not be interfered with.

According to the present invention, a path on which a tool is caused to move is automatically controlled in order to prevent an interference between the tool and the object. Further, a programmer is not required to to instruct the relay point, etc. in a machining program. An operator is also not required to manually move the tool every time the tool is moved. Thus, it possesses automation. Furthermore, it has advantages over the barrier function and the stroke limit function (wherein the move action of the tool is stopped at the time when the tool arrives at the prohibit area) because the move action of the tool is continued without stopping. Accordingly, unexpected stops of a machining program can be prevented during working operation automatically. Thus, a highly reliable numerically controlled lathe can be provided.

DESCRIPTION OF THE PREFERRED EMBODIMENT

Figure 1:
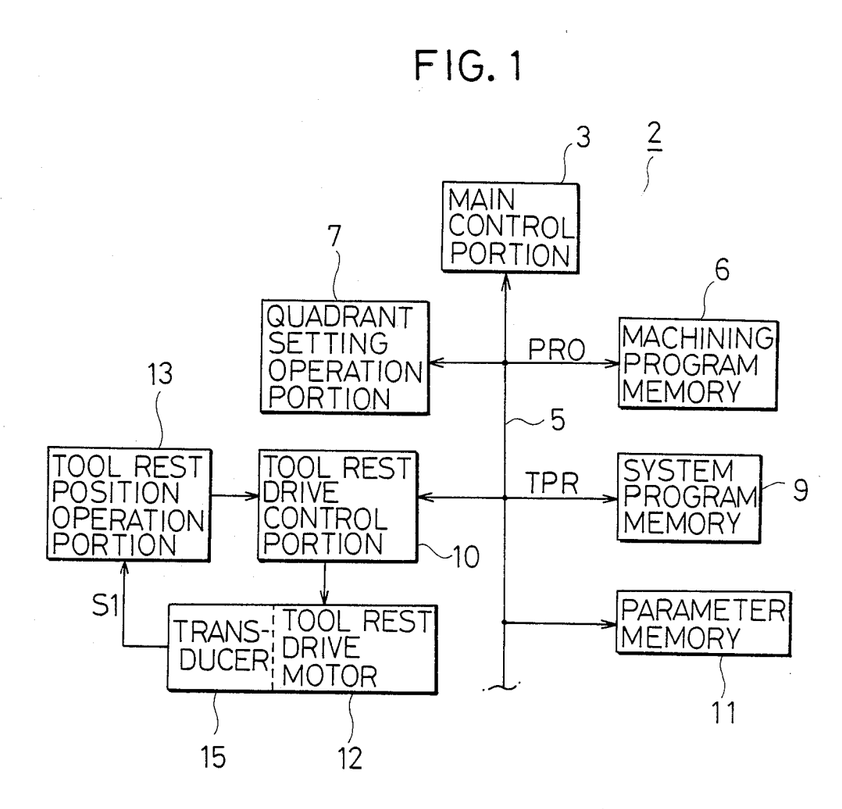
FIG. 1 is a control block diagram showing one example of a numerically controlled lathe to which a tool move control method according to the present invention is applied.

A numerically controlled lathe 2, as shown in FIG. 1, includes a main control portion 3. The main control portion 3 is connected with a machining program memory 6, a quadrant setting operation portion 7, a system program memory 9, a tool rest drive control portion 10, a parameter memory 11, etc., through a bus line 5. The tool rest drive control portion 10 is connected with a tool rest drive motor 12 and a tool rest position operation portion 13. The tool rest position operation portion 13 is connected with a transducer 15 provided with a tool rest drive motor 12 for outputting a signal S1 every predetermined rotary angle of the tool rest drive motor 12.

Figure 2:
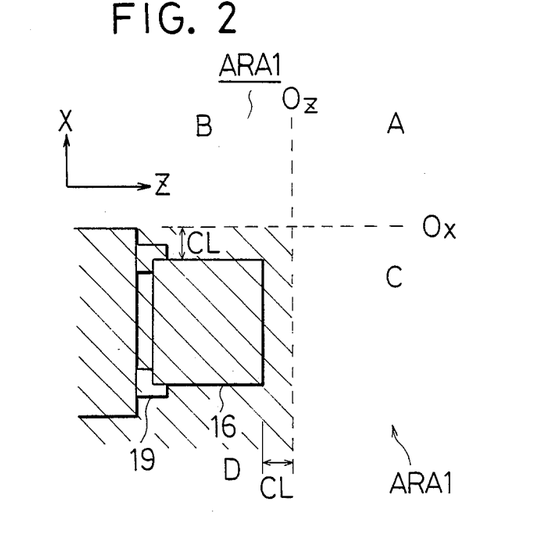
FIG. 2 is a plan view showing one example of a workpiece interference area set in the vicinity of the workpiece.

Since the numerically controlled lathe 2 has the above-mentioned arrangement, when machining, firstly, the main control portion 3 reads out a machining program PRO corresponding to a workpiece 16 to be machined from the machining program memory 6 to allow the quadrant setting operation portion 7 to set a workpiece interference area ARA1, as shown in FIG. 2, based on the size of a raw material of a workpiece shown in the machining program PRO. In the workpiece interference area ARA1, coordinate axes $O_x$, $O_z$ are set in such a manner as to remain a predetermined clearance quantity CL (usually, 1 mm or so) on the Z axis extending in the horizontal direction in the figure and X axis extending in the perpendicular direction thereto with respect to the size of the raw material of the workpiece 16 indicated in the machining program PRO. At this time, if four quadrants divided by the coordinate axes $O_x$, $O_z$ are represented by A, B, C and D, the quadrant D is set as the machining area where a tool which is being rapidly moved is prohibited from entering. Reference numeral 19 denotes a chuck for holding the workpiece 16.

Figure 3:
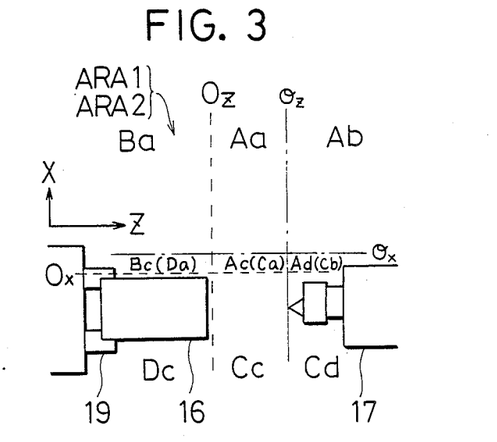
FIG. 3 and FIG. 4 are plan views showing one example of interference areas set in the vicinity of the workpiece and a tailstock.

The quadrant setting operation portion 7, when the tailstock 17 is present, reads out the Z coordinate value of the front end of the tailstock 17 and the X coordinate value of the side surface thereof from the parameter memory 11 and sets a tail stock interference area ARA2 as shown in FIG. 3. In the tailstock interference area ARA2, there are set a coordinate axis $o_z$ passing the front end of the tailstock 17 and a coordinate axis $o_x$ remaining a predetermined clearance quantity with respect to the side surface of the tailstock 17. At this time, if four quadrants divided by the coordinate axes $o_x$, $o_z$ are represented by a, b, c and d, the quadrant d is set as a tool entry prohibit area. These quadrants a, b, c and d are arranged in mirror image, i.e., line symmetry with the setting state of the quadrants A, B, C and D.

If such set workpiece interference area ARA1 and tailstock interference area ARA2 are overlapped with respect to each other as shown in FIG. 3, nine areas are usually produced due to overlapping modes of the respective quadrants. In the respective areas, a quadrant with respect to the workpiece interference area ARA1 to which the area belongs is designated by a capital letter first, and then a quadrant with respect to the tailstock interference area ARA2 to which the area belongs is designated by a small letter. This means that the area Ba belongs to a quadrant B in the workpiece interference area ARA1, and to a quadrant a in the tailstock interference area ARA2.

In the three areas sandwiched by the coordinate axis $O_x$, $o_x$, either one of indicated two area symbolic reference characters is effective depending on the positional relation between the coordinate axis $O_x$ and $o_x$. That is, when the coordinate axis $O_x$ is located at a lower position in FIG. 3 with respect to $o_x$, symbolic reference characters Bc, Ac and Ad (which are not included in the parenthesis in the respective areas of FIG. 3) are effective. On the other hand, when the coordinate axis $O_x$ is located at an upper position in FIG. 3 with respect to $o_x$, symbolic reference characters Da, Ca and Cb (which are included in the parenthesis in the respective areas of FIG. 3) are effective.

Figure 5:
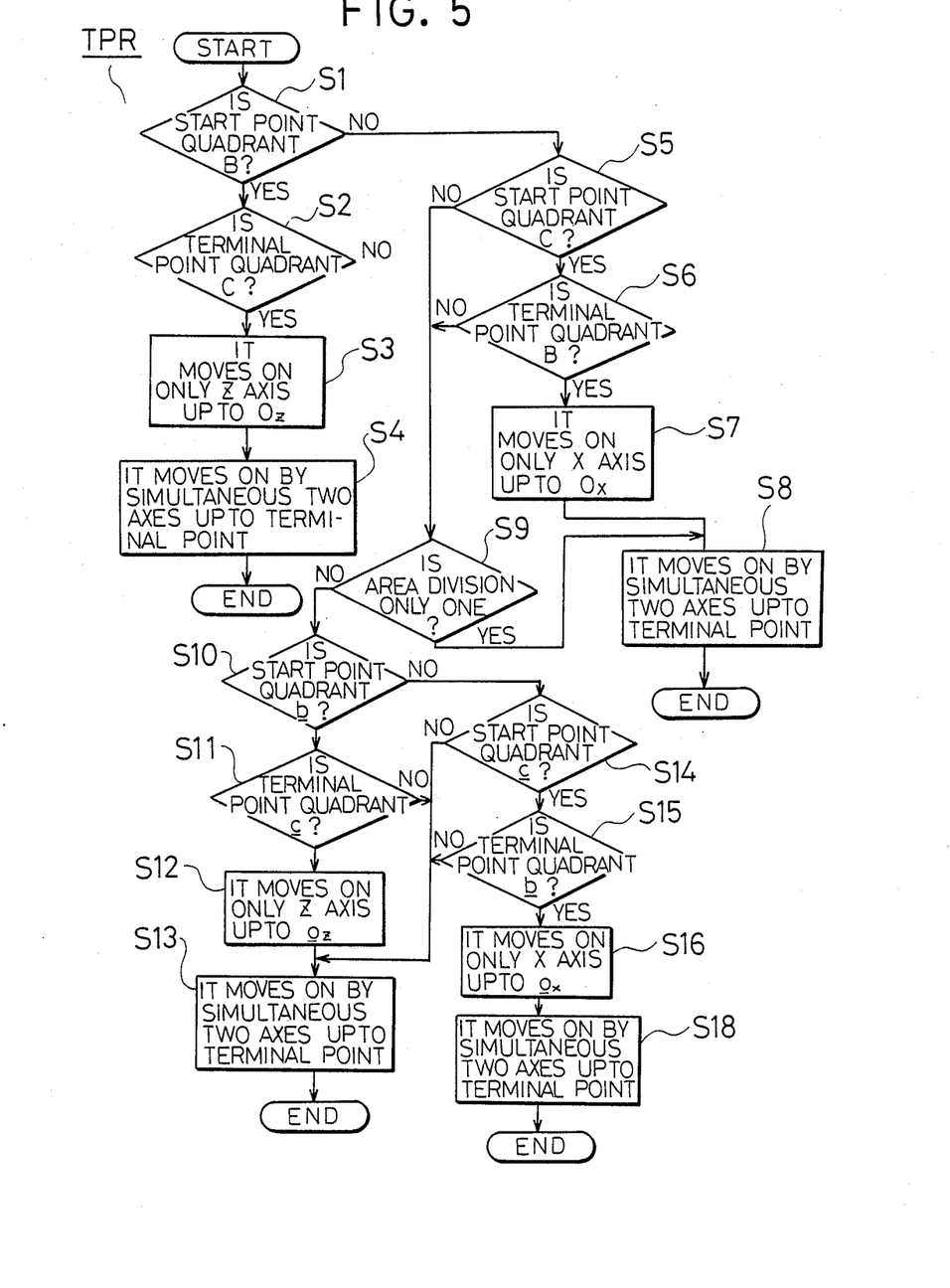
FIG. 5 is a flow chart showing one example of a tool move program.

In this way, when the respective interference areas corresponding to the workpiece 16 to be machined and the tailstock 17 are set by the quadrant setting operation portion 7, the main control portion 3 performs a machining operation with respect to the workpiece 16 based on the machining program PRO. At this time there occurs many cases, such as, tool exchange, positioning with respect to another machining position, etc., where a tool is required to be rapidly moved. When such move instruction (usually by G00 instruction according to EIA/ISO code) is instructed in the machining program PRO, the main control portion 3 immediately reads out a tool move program TPR from the system program memory 9 and controls a move mode of the tool instructed to move so that it will not interfere with the workpiece 16 and the tailstock 17. That is, the tool move program TPR, as shown in FIG. 5, judges whether the present tool edge position is in quadrant B in the workpiece interference area ARA1 in step S1. The present tool edge position is always determined by the tool rest position operation portion 13 based on a signal S1 outputted from a transducer 15 attached to the tool rest drive motor 12 and can be easily obtained through the tool rest drive control portion 10. When the tool is in quadrant B, it goes into step 2, wherein the terminal point instructed by the machining program PRO to which the tool is to be moved (the instruction method of the terminal point in the machining program PRO may be either an instruction by means of incrementary value based on the start point or an instruction by means of absolute value based on the mechanical origin) is judged whether it exists in quadrant C from the workpiece interference area ARA1 which the quadrant setting operation portion 7 set. As a result, when the terminal point is quadrant C, (i.e., when the tool is moved from quadrant B to quadrant C), it goes to step S3, wherein the tool rest drive control portion 10 is instructed to move the tool in the direction of the Z axis from the present position of quadrant B to the coordinate $O_z$. In response to the foregoing instructions, the tool rest drive control portion 10 drives the tool rest drive motor 12 to move the tool together with the tool rest on which the tool is attached in the direction the Z axis, and an interference between the tool and the workpiece 16 is prevented in advance. When the tool arrives at the coordinate axis $O_z$ and there remains no risk of interference between the tool and the workpiece 16, it goes into step S4, wherein the tool is moved to the terminal point by simultaneous two axes drive of X and Z axes (the term "simultaneous two axes drive" used herein includes a case that either one of the axes is zero in speed rate. In this case, the tool is moved only in the X or Z axis direction. The same is true when the term "simultaneous two axes drive" is used hereinafter).

Next, when the present position of the tool, (i.e., the start point for movement) is not in quadrant B during step S1, it goes into step S5 wherein it is judged whether the start point is in quadrant C. In the case the start point C is in quadrant C, it goes into step S6, wherein it is judged whether the terminal point is in the quadrant B. When the terminal point is in quadrant B, (i.e., when the tool is moved from quadrant C to quadrant B) it goes into step S7. In step S7, the tool rest drive control portion 10 is instructed to move the tool first in the direction of X axis from the present position of quadrant C to the coordinate axis $O_x$. In response to the foregoing instructions, the tool rest drive control portion 10 drives the tool rest drive motor 12 to move the tool together with the tool rest on which the tool is attached in the direction of the X axis, and an inteference between the tool and the workpiece 16 can be prevented in advance. When the tool arrives at the coordinate axis $O_x$ and there remains no risk of interference between the tool and the workpiece 16, it goes into step S8, wherein the tool is moved to the terminal point by the simultaneous two axes drive of the X and Z axes.

In steps S4 and S7, when the tailstock 17 is not in quadrant C as shown in FIG. 2, there is no problem. However, as shown in FIG. 3, when the tailstock 17 is in quadrant C, there is a risk that the tailstock 17 and the tool interfere with each other. However, when the tailstock 17 is in quadrant C, positions of the start point and the terminal point shown in the machining program PRO are usually in quadrant Cc of FIG. 3. An instruction using the quadrant Cd could only be caused by a programming mistake. Accordingly, as long as the machining program PRO is correctly prepared, the tool and the tailstock 17 do not interfere with each other.

If such interference should be about to occur because of a programming mistake, known collision prevention means such as a tailstock barrier, etc. can be used to prevent an interference between the tailstock 17 and the tool or the tool rest. However, the present invention intends to provide a tool move control method for rapid tool movement in which the quadrant instructions are correctly shown in the machining program PRO for the start point and terminal point positions. The following description will be made on the assumption that the machining program PRO is properly prepared without any mistake.

Step 9 is selected when in step S2 the start point is quadrant B and the terminal point is not quadrant C. In this case the tool is moved from quadrant B to quadrant B or A. Quadrant D is in the entry prohibit area and not entered except workpiece 16 is being machined. Step 9 is also selected when in step S5, the start point is neither the quadrant B nor C, (in which it is quadrant A), or when in step S6 the start point is quadrant C and the terminal point is not quadrant B, (in which the tool is moved from the quadrant C to the quadrant C or A).

In step S9, a judgement is made from the operation results of the area of the quadrant setting operation portion 7 on whether the prohibited area is only the workpiece interference area ARA1, or whether the tailstock interference area ARA2 also exists. During step 9, when the prohibited area is only the workpiece interference area ARA1, since no interference with the tailstock 17 exists in any it goes into step S8. In step 8, the tool rest is moved to the terminal point together with the tool by simultaneous two axes drive of the X and Z axes.

During step 9, when the tailstock interference area ARA2 and the workpiece interference area ARA1 are prohibited areas, step S10 results. In step S10, it is judged whether the quadrant of the start point is in quadrant b of the tailstock interference area ARA2. If the start point is in quadrant b, this exists at quadrants Ab or Cb. The quadrants Bb, Bd, Db and Dd do not exist, since the coordinate axis $O_z$ is always positioned at the left of the coordinate axis $o_z$ in FIG. 3), it goes into step S11.

In step S11, whether the quadrant of the terminal point is quadrant c is judged. Possible terminal points are Ac, Bc and Cc. If the terminal point is in quadrant C, it goes into step S12.

At this point in this, combinations between the start point and the terminal point existing are only those where the start point is Ab and the terminal points are Ac, Bc and Cc, and the start point is Cb and the terminal point is Cc. All the remaining combinations are removed by the steps S1 through S8.

The combination of the start point Cb and the terminal point Ac never occurs in view of the coordinate axes $O_x$, $o_x$ as already described in the foregoing.

In step S12, if the tool is located at a start point in either quadrant Ab or Cb it is moved first to the coordinate axis $o_z$ in the direction of Z axis through the tool rest drive control portion 10 to avoid interfering with the tailstock 17. When the tool arrives at the coordinate axis $o_z$ there remains no risk of an interference between the tool and the tailstock 17 and step S13 begins. In step 13 the tool is moved to the quadrants Ac, Bc and Cc where the terminal point exists by simultaneous two axes drive of the X and Z axes. Further, in step S11, when the quadrant of the terminal point is not c, i.e., in the case of the quadrants a, b (since the quadrant d is a tool entry prohibit area, it is impossible that quadrant d is the terminal point), the tool is moved only from the start point of the quadrant Ab or Cb to the quadrants Aa, Ab, Ba (only when the start point is quadrant Ab), Ca and Cb (since the quadrants Da and Dc are tool entry prohibit areas, these areas are not terminal points). Since there is no possibility of an interference between the tool and the workpiece 16 and the tailstock 17, it goes into step S13 immediately and the tool is moved from the start point to the terminal point by simultaneous two axes drive of the X and Z axes.

Next, in step S10, when the quadrant of the start point is not b, it goes into step S14, wherein a judgement is made whether the start point is the quadrant c. If the start point is quadrant c, accordingly Ac, Bc and Cc, it goes into step S15, wherein an judgement is made on whether the quadrant of the terminal point is b. In the case that the quadrant of the terminal point is b, thereby making start points Ac, Bc and Cc having the terminal point Ab and making the start point Cc having the terminal point Cb, it goes into step S16. In step S16, the tool is moved to $o_x$ in the direction of the X axis in order to eliminate the possibility of an occurrence of an interference between the tool and the tailstock 17. Then, in step S18, the tool is moved to the terminal point by simultaneous two axes drive of X and Z axes.

In step S15, when the terminal point is not the quadrant b but the quadrants a, and b, (i.e., when the quadrants are Aa, Ac, Ba, Bc, Ca and Cc) possible combinations of the start point and the terminal point are that the start point is Ac and the terminal points are Aa, Ac, Ba, Bc and Cc, that the start point is Bc and the terminal points are Aa, Ab, Ba and Bc and that the start point is Cc and the terminal points Aa, Ac, Ca and Cc (all other combinations are excluded by steps S1 through S8. When it goes into step S10, it is limited to the cases (1) the start point is the quadrant A, (2) the start point is the quadrant B and the terminal point is B or A, and (3) the start point is the quadrant C and the terminal point is the quadrant C or A). In any case, since there remains no risk of an interference, it goes into step S13, wherein the tool is moved from the start point to the terminal point by simultaneous two axes control of X and Z.

Further, in step S14, when the start point is not in quadrant c, which happens when the quadrants are Aa, Ba and Ca in quadrant a, possible combinations of the start point and the terminal point are limited to the start point being Aa and the terminal points being Aa, Ab, Ac, Ba, Bc, Ca, Cb and Cc, the start point being Ba and the terminal points being Aa, Ab, Ac, Ba and Bc, and the start point being Ca and the terminal points being Aa, Ab, Ca, Cb and Cc. Since there remains no risk of an interference, it goes into step S13, wherein the tool is moved from the start point to the terminal point by simultaneous two axes control of X and Z.

In this way, when the tool is moved from the start point to the terminal point based on a tool move program TPR in such a manner as to avoid an interference with the workpiece 16 and the tailstock 17 and the moving action is completed, the main control portion 3 resumes a machining operation based on the machining program PRO.

Figure 6:
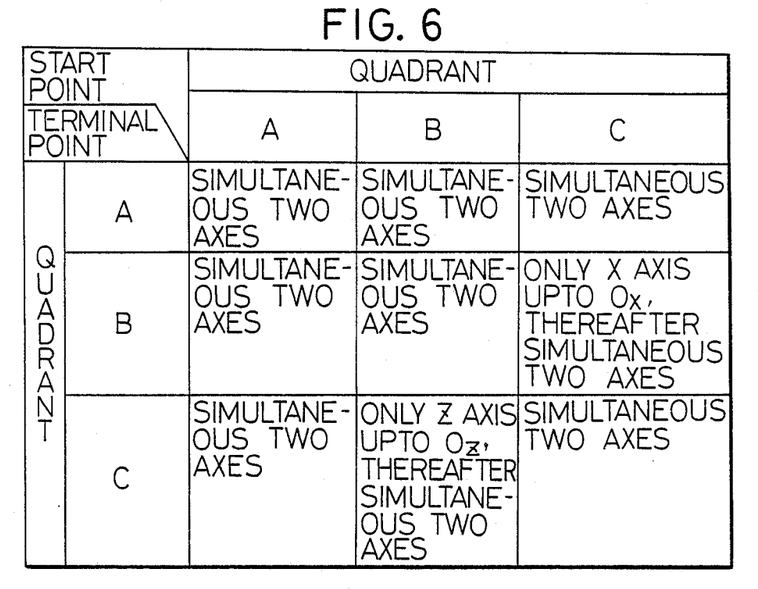
FIG. 6 and FIG. 7 are illustrations showing moving modes of the tool in the respective interference areas.
Figure 7:
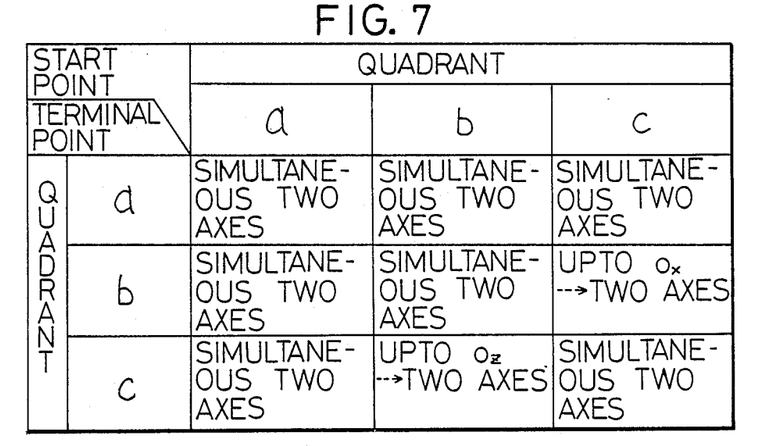

Move modes of the tool in the workpiece interference area ARA1 and the tailstock interference area ARA2 shown in the tool move program TPR are summarized in FIG. 6 and FIG. 7.

Figure 4:
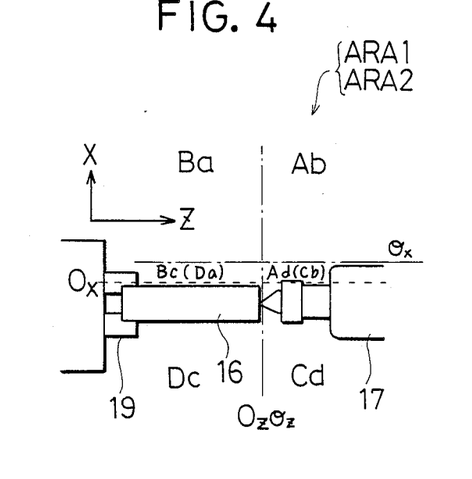

FIG. 3 illustrates one condition wherein the tailstock 17, in spite of its existence, is not used for the workpiece 16. As shown in FIG. 4, the tool move program TPR is likewise applicable when the workpiece 16 is machined by using the tailstock 17. In this case, since the coordinate axes $O_z$ and $o_z$ are held in alignment with respect to each other, the quadrants Aa, Ac, Ca and Cc of FIG. 3 are not present.

The effects of the above-mentioned embodiments will be summarized hereunder. That is, if it is determined that a rapid tool move from a start point and a terminal point is heated, a machining program PRO gives instructions. A workpiece interference area ARA1 is set for a workpiece 16. An entry prohibit quadrant, such as a quadrant D, for prohibiting an entry of the tool and two or more of quadrants, such as A, B and C, are set where a move of the tool is permitted. Depending on where the start point and the terminal point is, a move mode of the tool begins in a manner to avoid the entry prohibit quadrant. A move path of the tool can thereby be automatically controlled in order to prevent an interference between the workpiece 16 and the tool.

Further, along with setting workpiece interference area ARA1, a tailstock interference area ARA2 may be set for a tailstock 17 in the tailstock interference area ARA2. An entry prohibit quadrant, such as a quadrant d, for prohibiting the entry of a tool in that quadrant and two or more quadrants, such as quadrants a, b and c, which permit a move of the tool, will be the set. According to the quadrants of the workpiece interference area ARA1 and the tailstock interference area ARA2 to which the start point and the terminal point belong, a move mode of the tool can then be made in such a manner to avoid the entry prohibit quadrant with respect to the two interference areas. This prevents an interference with the workpiece 16 and the tailstock 17.

Although the present invention has been described with reference to the preferred embodiment, the embodiment described herein is for illustrative purposes only and not in limitation thereof. Also, the scope of the present invention is defined in the appended claims and should not be limited by description of the preferred embodiment. Accordingly, it will be understood that all the appended claims embody the true spirit of the invention and should be given their scope.

What is claimed is:

1. In a numerically controlled lathe which can rapidly move a tool around an object, a method for controlling tool movement comprising the steps of:
    defining a two dimensional interference area associated with said object for a machining program into which said tool should not be moved when said tool is instructed to move from a start point to a terminal point;
    establishing a two dimensional, four quadrant, rectangular coordinate system;
    designating one entry prohibit quadrant of said two dimensional, four quadrant, rectangular coordinate system, said entry prohibit quadrant including said interference area;
    designating the other three quadrants of said two dimensional, four quadrant, rectangular coordinate system as quadrants in which tool movement is permitted;
    moving said tool from said start point to said terminal point by:
    moving said tool rapidly by simultaneous two axes driving from said start point to said terminal point when quadrants to which said start point and said terminal point belong are the same or adjacent quadrants;
    moving said tool rapidly by one axis driving to a bound of said quadrant said tool is in, except said prohibit quadrant, to which said start point and said terminal point do not belong, when quadrants to which said start point and said terminal point belong are quadrants not adjacent with each other and then moving said tool by simultaneous two axes driving to said terminal point after reaching said bound.

2. A tool move control method according to claim 1, wherein said start point and said terminal point are instructed in a machining program.

3. A tool move control method according to claim 1, wherein said object is a workpiece to be machined and said interference area is a workpiece interference area set based on said workpiece.

4. A tool move control method according to claim 3, wherein said workpiece interference area is formed by two coordinate axes set in the directions of Z and X axes based on a size of the workpiece.

5. A tool move control method according to claim 1, wherein said object is a tailstock and said interference area is a tailstock interference area set based on said tailstock.

6. A tool move control method according to claim 5, wherein said tailstock interference area is formed by two coordinate axes set in the directions of Z and X axes based on a front end position of said tailstock and a side surface position of said tailstock.

7. A tool move control method according to claim 1, wherein said object is a workpiece to be machined and a tailstock, and said interference area is a workpiece interference area set based on said workpiece and a tailstock interference area set based on said tailstock.

8. A tool move control apparatus for moving a tool from a start point to a terminal point comprising:
    a first memory means for storing information regarding a size of at least one object not to be interfered with;
    a quadrant setting operation means for establishing a two dimensional, four quadrant, rectangular coordinate system for each of said at least one objects, each two dimensional, four quadrant, rectangular coordinate system including:
        a bound which marks the end of one quadrant and the beginning of another quadrant,
        one tool entry prohibit quadrant determined using said first memory means information, and
        three quadrants in which tool movement is permitted;
    a second memory means for storing a tool move program which decides a move path, said second memory means including:
        a readout means,
        means for determining when to move said tool rapidly by simultaneous two axes driving from said start point to said terminal point when quadrants to which said start point and said terminal point belong are the same or adjacent quadrants,
        means for determining when to move said tool rapidly by one axis driving to a bound of one of said quadrants which is not a bound of said tool entry prohibit quadrant, to which said start point and said terminal point do not belong, when quadrants to which said start point and said terminal point belong are quadrants not adjacent to each other, and means for determining when to move said tool by said simultaneous two axes driving to said terminal point after reaching said bound;

a tool position operation means for determining the present tool position; and a tool move drive means for driving said tool from said start point to said terminal point so that said tool does not interfere with said object based on present tool position and information from said tool move program read out means.

9. A tool move control apparatus according to claim 8, wherein said object not to be interfered with is a workpiece to be machined.

10. A tool move control apparatus according to claim 8, wherein said object not to be interfered with is a tailstock.

11. A tool move control apparatus according to claim 8, wherein said object not to be interfered with is a tailstock.

* * * * *